(12) United States Patent
Frable et al.

(10) Patent No.: US 6,178,756 B1
(45) Date of Patent: Jan. 30, 2001

(54) METHOD AND APPARATUS FOR CHILLING PERISHABLE LIQUIDS

(75) Inventors: Norman B. Frable, McKinney; Cornelius J. F. Elenbaas, Colleyville; Steve William Jones, Coppell, all of TX (US)

(73) Assignee: Tri-Gas, Inc., Irving, TX (US)

( * ) Notice: Under 35 U.S.C. 154(b), the term of this patent shall be extended for 0 days.

(21) Appl. No.: 09/311,991

(22) Filed: May 14, 1999

(51) Int. Cl.⁷ .................................................. F25D 25/00
(52) U.S. Cl. ......................................................... 62/62
(58) Field of Search .......................................... 62/64, 98

(56) References Cited

U.S. PATENT DOCUMENTS

| | | | |
|---|---|---|---|
| 2,909,433 | * 10/1959 | Morrison | 99/136 |
| 3,672,182 | * 6/1972 | Stowasser et al. | 62/98 |
| 4,687,672 | 8/1987 | Vitkovsky | 426/524 |
| 5,218,826 | 6/1993 | Kirschner et al. | 62/48.1 |
| 5,267,449 | 12/1993 | Kiczek et al. | 62/86 |
| 5,363,658 | 11/1994 | Appolonia | 62/63 |
| 5,471,846 | 12/1995 | Appolonia et al. | 62/63 |
| 5,520,005 | 5/1996 | Appolonia | 62/63 |
| 5,692,382 | 12/1997 | Davison | 62/63 |
| 5,732,559 | 3/1998 | Horn et al. | 62/62 |
| 5,765,381 | 6/1998 | Renz | 62/63 |

* cited by examiner

Primary Examiner—Corrine McDermott
Assistant Examiner—Malik N. Drake

(57) ABSTRACT

A process and apparatus for preparing perishable liquid products for shipment aboard uncooled tankers in which liquid product is mixed with a cryogen such as liquid nitrogen. The mixing may be carried out simultaneously with tanker loading by use of a mixing/injection lance positioned through a port in the tanker, with the nitrogen being introduced at one end of the lance and the liquid product being introduced through an aperture in the sidewall of the lance downstream from the nitrogen entrance along a path of travel not directly at the central axis of the lance, to produce a centrifugal action in the liquid product. Alternatively, the cryogen may be mixed with the liquid product by introduction into a body of the liquid to be chilled at a submerged location.

12 Claims, 2 Drawing Sheets

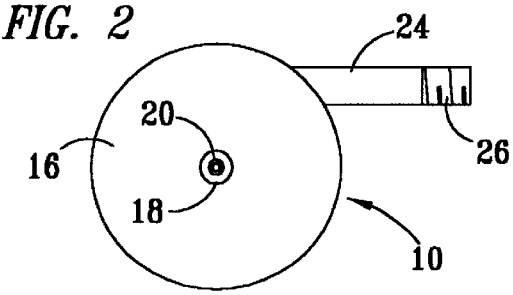
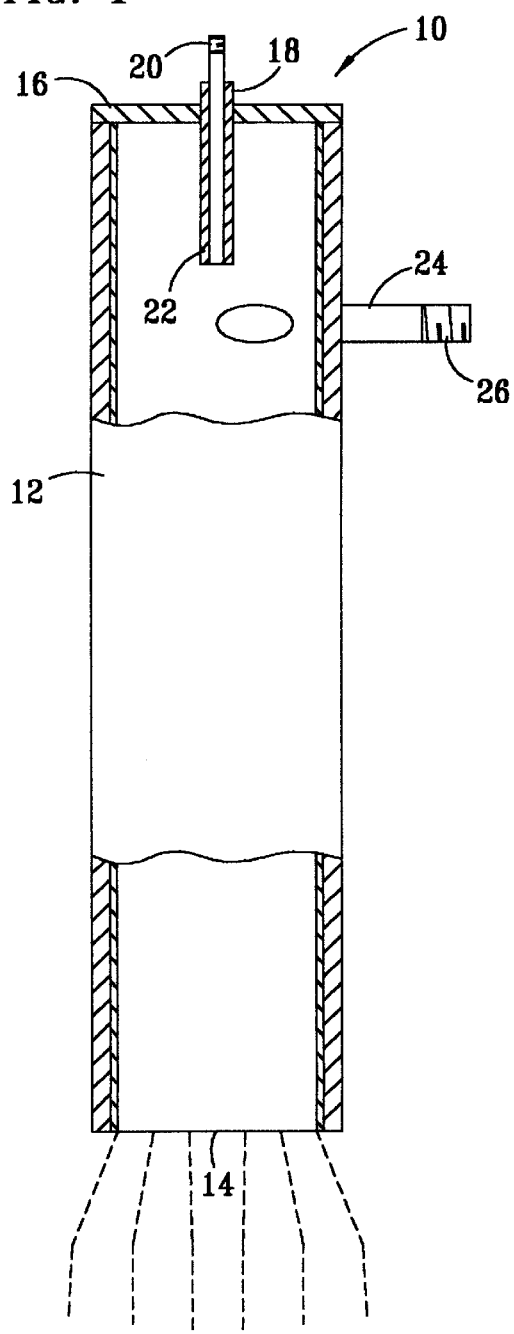
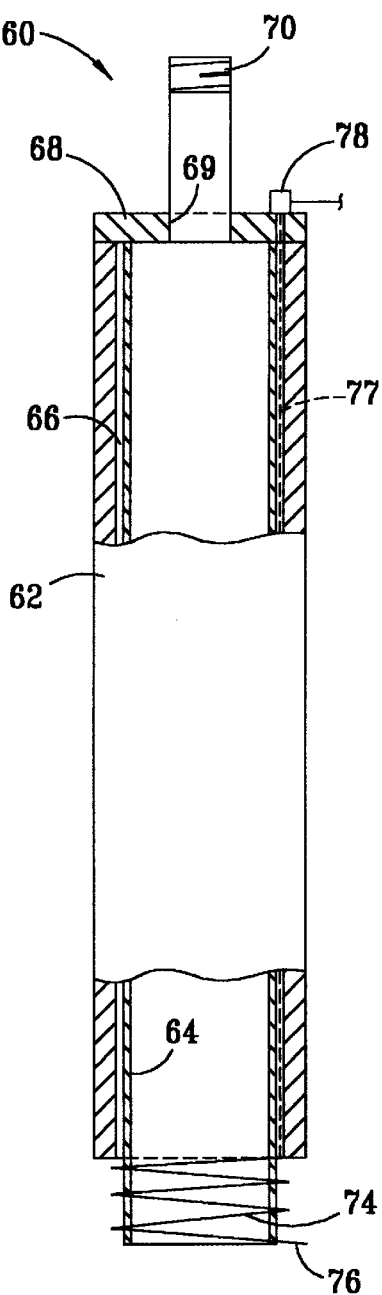

METHOD AND APPARATUS FOR CHILLING PERISHABLE LIQUIDS

TECHNICAL FIELD OF THE INVENTION

This invention relates to a process and apparatus for chilling perishable liquid products such as orange juice, and more particularly to technology which renders such liquids suitable for transport in non-refrigerated tanker trucks.

BACKGROUND OF THE INVENTION

Certain perishable liquid products such as orange juice and other fresh juices must be maintained during transportation and storage at temperatures substantially below ambient temperature in order to prevent spoilage and to satisfy applicable governmental regulations. With respect to fresh orange juice, for example, it is typically required that the product be maintained at all times at or below a maximum temperature of 38 degrees Fahrenheit. Above that temperature, orange juice risks fermentation.

While it is possible to utilize vehicles with on-board cooling systems to satisfy temperature requirements for perishable liquid products, the cost and maintenance of such systems on liquid tankers ordinarily makes this an economically unattractive alternative. As a result, use of refrigerated vehicles for such shipments is not common. Conventionally, juices to be stored and transported via uncooled tanker trucks are subjected to chilling by mechanical refrigeration such as ammonia and glycol chillers prior to loading at the point of origin. While this may prove effective if the length of travel is short, or the climate through which the shipment is to travel is rather cool, such techniques have not proven to be universally satisfactory. These conventional cooling procedures at the point of origin are at times supplemented by adding quantities of ice or mechanically frozen juice to the uncooled tanker along with the liquid juice. This can improve the success rate for shipment, but at a cost of considerable time and labor at the point of origin, and with uncertainty as to the actual level of heat load protection achieved.

SUMMARY OF THE INVENTION

This invention contemplates a method, and apparatus therefor, which quickly and economically renders perishable liquid products such as orange juice suitable for shipment in long-haul uncooled tanker trucks. Use of the invention has proved successful in protecting orange juice from temperature degradation during shipment. It may also prove applicable to other fruit juices, milk and other perishable liquids shipped in uncooled tankers where maintenance of temperatures substantially below ambient is necessary.

In accordance with the invention, a perishable liquid product such as orange juice is chilled by mixing it with a cryogen, preferably liquid nitrogen. In the preferred embodiment, this mixing occurs simultaneously with the loading of the liquid product aboard a transport tanker by positioning a mixing/injection lance through the fill port of the tanker. Alternatively, the cryogen may be mixed with the liquid product by introducing cryogen at a submerged location in the already loaded tanker, or another vessel filled with the liquid product.

A mixing/injection lance constructed in accordance with the invention preferably comprises an elongate tube having an open end and a closed end. The closed end of the lance is provided with a cryogen entry port for introduction of cryogen to flow along the axis of the lance to and through the open end. A liquid entry port is located on the sidewall of the lance downstream from the cryogen entry port, and is oriented so that entry of the liquid product is at a substantially right angle to the tube. In the preferred embodiment of the mixing/injection lance, the axis of the liquid entry port does not lie along a radius of the lance cross-section, so that liquid product entering the port undergoes a centrifugal action, swirling downwardly along the wall of the tube to the open end.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which:

FIG. 1 is a plan view, partially in section, of a mixing/injection lance constructed in accordance with this invention;

FIG. 2 is a top view of the mixing/injection lance of FIG. 2;

FIG. 4 is a plan view, partially in section, of an injection lance for use in the invention.

DESCRIPTION OF THE PREFERRED EMBODIMENTS

Figure 3:
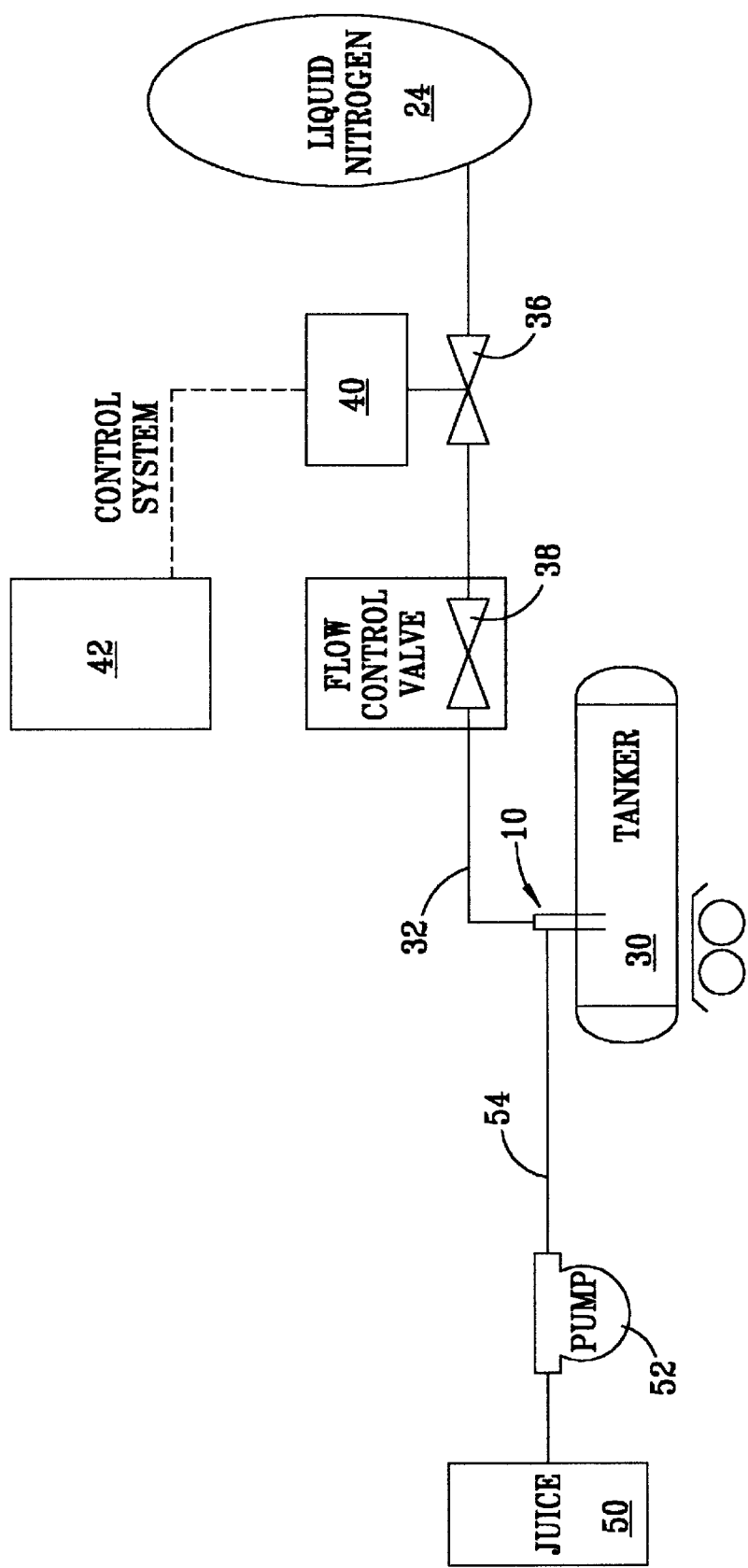
FIG. 3 is a schematic diagram of a flow circuit for practice of the invention using the lance of FIGS. 1 and 2.

One apparatus constructed in accordance with the invention is a mixing/injection lance for simultaneous loading and chilling of a perishable liquid into a tanker truck, indicated generally by the reference numeral 10 in FIGS. 1 and 2. The mixing/injection lance 10 is a stainless steel tube 12 having an open end 14. The end of tube 12 opposite open end 14 is closed by a stainless steel cap 16 having a central entry aperture 18 therethrough. Aperture 18 is provided with a threaded male fitting 20 suitable for connection with a line carrying liquid nitrogen to the lance 10. Cryogen nozzle 22 extends inwardly of cap 16 from fitting 20 so that it is adapted to forward a liquid nitrogen stream centrally down lance 10 toward open end 14.

A tubular product port 24, having a male threaded fitting 26 for connection to a perishable liquid product supply line, is positioned through the sidewall of tube 12 slightly downstream from the cryogen nozzle 22. Product port 24 lies in a plane which describes a right angle with the axis of tube 12, but is not oriented along a radius of tube 12. As shown in FIG. 2, port 24 is positioned so that perishable liquid product entering through port 24 is directed generally along the wall of tube 12. This permits a centrifugal swirling action of the liquid product downwardly along the wall of tube 12 during loading, promoting contact and heat transfer with the liquid cryogen flowing centrally in the tube 12 from nozzle 22. This action also minimizes the tendency for the perishable liquid product to freeze along the sidewalls of tube 12. Satisfactory dimensions for tank 12 have been found to be a three foot length with an 8 inch inside diameter. Port 24 may have a three inch inside diameter, and nozzle 22 a one inch diameter.

FIG. 3 schematically illustrates the simultaneous chilling and loading of a juice in accordance with the method of this invention, using the mixing/injection lance 10 of FIGS. 1 and 2. The lance 10 is positioned through the top loading port of a tanker truck 30 so that open end 14 is positioned in the upper portion of the tank. Cryogen fitting 20 is connected with an insulated liquid nitrogen supply line 32, which extends from liquid nitrogen tank 34 through a shutoff valve 36 and a flow control valve 38. Shutoff valve 36 is operated by a solenoid 40 which is controlled by a remote control system 42 which includes a timer for limiting the time of injection of the liquid nitrogen during loading by causing the solenoid 40 to close valve 36 when the control system 42 times out in accordance with operator-input instruction. Flow control valve 38 may be adjusted by the operator to alter the rate of nitrogen flow through line 32, controlling the amount and rate of cooling and the percentage of frozen slush produced in the load.

The juice is delivered from tank 50 by a pump 52 through line 54 connected to perishable liquid product supply fitting 26 on lance. Control system 42 is set to cause simultaneous delivery of juice and liquid nitrogen until approximately 85% of the capacity of tanker 30 has been filled, at which time the shutoff valve 36 closes to stop the flow of liquid nitrogen. The reason for this methodology is that continued flow of the liquid nitrogen with tanker 50 nearly full will cause frothing which may blow product outwardly from the tanker.

When chilling the liquid product to the desired temperature and frozen consistency, the amount of cryogen is not absolutely determinable. It will vary depending on the inlet temperature of the product. However, operational experience quickly enables the user to determine the relationship between the product inlet temperature and amount of cryogen required for the final product temperature and frozen consistency desired, so that the cryogen flow rate and duration may be established accordingly.

This arrangement has been utilized to load and chill fresh orange juice into a 5500 gallon transport tanker from a storage tank maintained the juice at a temperature of 38 degrees Fahrenheit. The orange juice was pumped at a relatively constant rate of 145 gallons per minute for a fill time of about thirty eight minutes, and 400 gallons of liquid nitrogen were injected through the lance over a period of about three quarters of the juice fill time. The liquid temperature of the loaded juice was approximately 29.5 degrees Fahrenheit, with approximately ten percent of the loaded juice in the form of a frozen slush floating atop the load. Slush measurements were taken by sampling the depth of slush in the load through the fill port.

While liquid nitrogen, with a boiling point of −320 degrees Fahrenheit, is the preferred cryogen for use in practice of the invention, other cryogens may be employed. For example, liquefied air, carbon dioxide and liquefied noble gases might alternatively be employed. The spent cryogen is the form of a gas is vented from the tanker, so that the area around the tanker should be well ventilated.

In addition to practicing the method of this invention by such simultaneous loading and chilling of a tanker using mixing/injection lance 10, effective chilling may also be produced by submerged injection of liquid cryogen into a contained body of the liquid product to be chilled, either already loaded onto a tanker, or placed in a stationary vessel from which the chilled product may be pumped to a tanker. Such injection may be carried out using the injection lance 60 depicted in FIG. 4.

Injection lance 60 provides for the injection of liquid cryogen at a submerged location in a body of liquid product to be chilled. Concentric stainless steel tubes 62 and 64 form the body of lance 60, defining an annular space 66 therebetween which is evacuated for thermal insulation. One end of lance 60 is fitted with a stainless steel cap 68 having a central entry aperture 69. Cryogen entry fitting 70 extends through aperture 69.

The open end 74 of inner tube 64 extends beyond the end of tube 62, and is provided with resistive heating element 76 connected by wire 77 running through evacuated space 66 to a terminal 78 on cap 68. Terminal 78 may be connected to a suitable source (not shown) of electricity. The heating element 76 may be activated as needed to keep lance 60 from being clogged with accumulated slush. The lance should be of sufficient length to place the open end 14 near the bottom of the vessel containing the liquid product, to maximize heat transfer. For typical tankers, a length of 8 feet with a diameter of one foot has proven satisfactory. The introduction of the cryogen using the lance 60 produces a turbulent mixing action for heat transfer.

A fully loaded 5500 gallon transport tanker has been treated with introduction of liquid nitrogen using the injection lance of FIG. 4 to chill and partially freeze orange juice from 38° F. to 29.5° F. with a five percent slush.

Because most applications of this invention will be batch operations involving large volumes, the precise temperature and consistency of the product may not be achieved during simultaneous loading and chilling with the lance of FIGS. 1 and 2. Consequently, the injection lance of FIG. 4 may be utilized to finish the product to the desired characteristics. The injection lance of FIG. 4 has been used in this way to supplement the heat load protection following loading and chilling using the mixing/injection lance of FIGS. 1 and 2. In one instance, orange juice was cooled during the loading phase using the lance of FIGS. 1 and 2 from 38° F. to 31° F. Additional liquid nitrogen was subsequently introduced at the bottom of the load through injection lance 60 to further cool to 29.5° F., and to produce a ten percent frozen slush.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A method for chilling a perishable juice in order to prepare it for shipment in an uncooled tanker comprising:
   (a) removably positioning an elongate tubular lance through a top port of the tanker; and
   (b) introducing a cryogen through the lance along a flow path leading into the tanker while introducing the juice into the lance along a path distinct from the cryogen flow path to produce a chilled, partially frozen slush of juice in the tanker.

2. The method of claim 1, wherein the cryogen is introduced at one end of the lance for flow through the lance, and the juice is introduced through an aperture in the sidewall of the lance spaced downstream from the point of entry of the cryogen.

3. The method of claim 2, wherein the path of juice travel into the lance is not along a radius of the cross-section of the lance.

4. A mixing/injection lance for chilling a perishable liquid for transport in a tanker truck having an upper fill port, comprising:
   (a) an elongate tube having an open end and a closed end, and sized for insertion through the tanker fill port;
   (b) a cryogen entry port through the closed end of the tube for introduction of a cryogen to flow along the axis of the tube to and through the open end; and
   (c) a liquid product entry port spaced longitudinally from the cryogen entry port for introduction of the perishable liquid product along a path non-intersecting with the axis of the tube.

5. The mixing/injection lance of claim 4, wherein the liquid product port is oriented on the sidewall of the tube so that its axis does not lie along a radius of a cross-section of the tube, whereby liquid product entering the port undergoes a centrifugal action, swirling downwardly along the wall of the tube to the open end.

6. A method of simultaneous transferring a liquid product into a receiving vessel while chilling the liquid product, comprising:

(a) Removably positioning an elongate tubular lance in an upper opening in the vessel; and (b) Introducing a cryogen through the lance along a flow path leading into the vessel while introducing the liquid product into the lance along a path distinct from the flow path of the cryogen.

7. The method of claim 6, wherein the cryogen is introduced in sufficient quantity to freeze a minor fraction of the liquid into slush form.

8. The method of claim 7, wherein the liquid product is orange juice.

9. The method of claim 6, wherein the cryogen is introduced at one end of the lance for flow through the lance, and the liquid product is introduced into the lance through an aperture in the sidewall of the lance spaced downstream from the point of entry of the cryogen.

10. The method of claim 9, wherein the path of liquid product travel into the lance is not directed along a radius of the cross-section of the lance.

11. A lance for transferring a liquid into a vessel having an upper fill port while chilling the liquid, comprising:

(a) an elongate tube having an open end and a closed end, and sized for insertion through the upper fill port of the vessel;

(b) a cryogen entry port through the closed end of the tube for introduction of a cryogen to flow in a flow path along the axis of the tube to and through the open end; and (c) a liquid entry port spaced from the cryogen entry port for introduction of the liquid to be transferred and chilled along a path distinct from the cryogen flow path.

12. The lance of claim 11, wherein the liquid entry port is in the side wall of the tube and has an axis not directed along a radius of the cross-section of the tube.

* * * * *